United States Patent
Lisoski et al.

(10) Patent No.: US 11,868,143 B2
(45) Date of Patent: Jan. 9, 2024

(54) METHODS OF CLIMB AND GLIDE OPERATIONS OF A HIGH ALTITUDE LONG ENDURANCE AIRCRAFT

(71) Applicant: AEROVIRONMENT, INC., Arlington, VA (US)

(72) Inventors: Derek Lisoski, Simi Valley, CA (US); Bart Dean Hibbs, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 33 days.

(21) Appl. No.: 17/605,899

(22) PCT Filed: Apr. 23, 2020

(86) PCT No.: PCT/US2020/029652
§ 371 (c)(1),
(2) Date: Oct. 22, 2021

(87) PCT Pub. No.: WO2020/223115
PCT Pub. Date: Nov. 5, 2020

(65) Prior Publication Data
US 2022/0121223 A1  Apr. 21, 2022

Related U.S. Application Data

(60) Provisional application No. 62/854,830, filed on May 30, 2019, provisional application No. 62/838,783, (Continued)

(51) Int. Cl.
*G05D 1/04* (2006.01)
*B64C 39/02* (2023.01)
(Continued)

(52) U.S. Cl.
CPC ............ *G05D 1/042* (2013.01); *B64C 39/024* (2013.01); *G05D 1/0005* (2013.01); *B64U 2101/00* (2023.01)

(58) Field of Classification Search
CPC .... G05D 1/042; G05D 1/0005; B64C 39/024; B64U 2101/00; B64U 10/25; B64U 50/19;
(Continued)

(56) References Cited

U.S. PATENT DOCUMENTS 2,335,692 A   11/1943   Murray
2,405,544 A   8/1946    Anjeskey
(Continued)

FOREIGN PATENT DOCUMENTS

AU   2007200943 A1   9/2007
CN   107963237 A     4/2018
(Continued)

OTHER PUBLICATIONS

International Search Report for PCT/US20/29652 dated Oct. 16, 2020.
(Continued)

*Primary Examiner* — Richard M Camby
(74) *Attorney, Agent, or Firm* — Concept IP LLP; Pejman Yedidsion; Eric Aagaard (57) ABSTRACT

Systems, devices, and methods including: at least one unmanned aerial vehicle (UAV); at least one battery pack comprising at least one battery; and at least one motor of the at least one UAV, where the at least one battery is configured to transfer energy to the at least one motor; where power from the at least one motor is configured to ascend the at least one UAV to a second altitude when the at least one battery is at or near capacity, and where the second altitude is higher than the first altitude; and where power from the at
(Continued)

least one motor is configured to descend the at least one UAV to the first altitude after the Sun has set to conserve energy stored in the at least one battery.

18 Claims, 9 Drawing Sheets

Related U.S. Application Data filed on Apr. 25, 2019, provisional application No. 62/838,833, filed on Apr. 25, 2019.

(51) Int. Cl.
*G05D 1/00* (2006.01)
*B64U 101/00* (2023.01)

(58) Field of Classification Search
CPC .. B64U 50/34; B60K 2016/003; B60K 16/00; B60K 1/04; B60Y 2200/51; B64D 2211/00; Y02T 10/90
See application file for complete search history.

(56) References Cited

U.S. PATENT DOCUMENTS

| | | | |
|---|---|---|---|
| 2,431,589 A | 11/1947 | Shuler | |
| 2,478,758 A | 8/1949 | Frieder et al. | |
| 2,712,874 A | 7/1955 | Murray | |
| 2,815,132 A | 12/1957 | Ben | |
| 2,898,058 A | 8/1959 | Del | |
| 3,012,737 A | 12/1961 | Dodd | |
| 3,032,332 A | 5/1962 | Rose et al. | |
| 3,306,578 A | 2/1967 | Meeks et al. | |
| 3,640,491 A | 2/1972 | Harrison | |
| 3,671,013 A | 6/1972 | Everson, Jr. et al. | |
| 4,269,374 A | 5/1981 | Miller | |
| 4,440,265 A | 4/1984 | Spagnoli | |
| 4,461,455 A | 7/1984 | Mills et al. | |
| 4,589,066 A | 5/1986 | Lam et al. | |
| 4,810,151 A | 3/1989 | Shem | |
| 5,175,712 A | 12/1992 | Vaccaro et al. | |
| 5,313,625 A | 5/1994 | Hess et al. | |
| 5,349,654 A | 9/1994 | Bond et al. | |
| 5,383,758 A | 1/1995 | Patrick | |
| 5,552,985 A | 9/1996 | Hori | |
| 5,662,315 A | 9/1997 | Neiss et al. | |
| 5,810,284 A * | 9/1998 | Hibbs | B64D 27/24 244/45 R |
| 5,903,717 A | 5/1999 | Wardrop | |
| 6,024,348 A | 2/2000 | Ventura et al. | |
| 6,056,237 A * | 5/2000 | Woodland | F42B 12/365 244/49 |
| 6,314,630 B1 | 11/2001 | Munk et al. | |
| 6,550,018 B1 | 4/2003 | Abonamah et al. | |
| 6,684,275 B1 | 1/2004 | Goldstein | |
| 6,808,143 B2 | 10/2004 | Munk et al. | |
| 6,979,288 B2 | 12/2005 | Hazlehurst et al. | |
| 7,319,738 B2 | 1/2008 | Lasiuk et al. | |
| 7,461,711 B2 | 12/2008 | McCrary et al. | |
| 7,874,053 B2 | 1/2011 | Stangel | |
| 7,917,242 B2 | 3/2011 | Jones | |
| 8,005,563 B2 | 8/2011 | Cobb et al. | |
| 8,020,816 B2 | 9/2011 | Laitila et al. | |
| 8,066,267 B2 | 11/2011 | Schaerer | |
| 8,141,819 B2 | 3/2012 | Brock | |
| 8,191,831 B2 | 6/2012 | Nadir | |
| 8,262,050 B2 | 9/2012 | Linz | |
| 8,577,519 B1 | 11/2013 | Varnavas et al. | |
| 8,661,684 B1 | 3/2014 | Boyd et al. | |
| 8,948,960 B2 | 2/2015 | Griffith | |
| 9,126,698 B2 | 9/2015 | Spinazze et al. | |
| 9,486,917 B2 | 11/2016 | Reid et al. | |
| 9,694,894 B2 | 7/2017 | Deakin | |
| 9,708,079 B2 | 7/2017 | DesJardien et al. | |
| 9,776,330 B2 | 10/2017 | Day et al. | |
| 9,895,741 B2 | 2/2018 | Oberoi et al. | |
| 9,957,064 B2 | 5/2018 | Miller et al. | |
| 9,959,773 B2 | 5/2018 | Raptopoulos et al. | |
| 10,005,541 B2 * | 6/2018 | Karem | H02S 10/40 |
| 10,017,277 B2 | 7/2018 | DesJardien et al. | |
| 10,095,242 B1 | 10/2018 | Novak | |
| 10,155,588 B2 | 12/2018 | Fisher et al. | |
| 10,391,543 B2 | 8/2019 | Boyd et al. | |
| 10,407,087 B1 | 9/2019 | Baker et al. | |
| 10,427,254 B2 | 10/2019 | Day et al. | |
| 10,640,297 B2 | 5/2020 | Kilibarda et al. | |
| 10,894,617 B2 | 1/2021 | Liaqat et al. | |
| 10,907,764 B2 | 2/2021 | Waller et al. | |
| 10,982,805 B2 | 4/2021 | Burton et al. | |
| 11,180,264 B2 | 11/2021 | Best et al. | |
| 2003/0183451 A1 | 10/2003 | Huang | |
| 2004/0075018 A1 | 4/2004 | Yamane | |
| 2005/0044700 A1 | 3/2005 | Ghuman et al. | |
| 2005/0116105 A1 | 6/2005 | Munk et al. | |
| 2006/0266885 A1 | 11/2006 | Hardaker et al. | |
| 2006/0278757 A1 | 12/2006 | Kelleher | |
| 2007/0131103 A1 | 6/2007 | McClellan et al. | |
| 2007/0168711 A1 | 7/2007 | Chen | |
| 2008/0033604 A1 | 2/2008 | Margolin | |
| 2009/0037770 A1 | 2/2009 | Troppmann et al. | |
| 2009/0236470 A1 | 9/2009 | Goossen et al. | |
| 2010/0004798 A1 | 1/2010 | Bodin et al. | |
| 2010/0049268 A1 | 2/2010 | Martins | |
| 2010/0217437 A1 | 8/2010 | Sarh et al. | |
| 2010/0292873 A1 | 11/2010 | Duggan et al. | |
| 2011/0000082 A1 | 1/2011 | Yamashita et al. | |
| 2011/0024587 A1 | 2/2011 | Tsai | |
| 2011/0054694 A1 | 3/2011 | Munk | |
| 2011/0137496 A1 | 6/2011 | Everett et al. | |
| 2012/0216384 A1 | 8/2012 | Immekus | |
| 2012/0273631 A1 | 11/2012 | Deros | |
| 2013/0062457 A1 | 3/2013 | Deakin | |
| 2013/0158697 A1 | 6/2013 | Stone et al. | |
| 2014/0001318 A1 | 1/2014 | Ehrenleitner | |
| 2014/0021288 A1 | 1/2014 | Elson et al. | |
| 2014/0032034 A1 | 1/2014 | Raptopoulos et al. | |
| 2014/0188776 A1 | 7/2014 | Shuster et al. | |
| 2014/0249693 A1 | 9/2014 | Stark et al. | |
| 2014/0316616 A1 | 10/2014 | Kugelmass | |
| 2014/0339356 A1 | 11/2014 | Deakin | |
| 2014/0353894 A1 | 12/2014 | DesJardien et al. | |
| 2015/0066248 A1 | 3/2015 | Arbeit et al. | |
| 2015/0097071 A1 | 4/2015 | Frolov et al. | |
| 2015/0097079 A1 * | 4/2015 | Frolov | B64C 39/024 290/55 |
| 2015/0102172 A1 | 4/2015 | Thurn | |
| 2015/0115106 A1 | 4/2015 | Coffey et al. | |
| 2015/0203200 A1 | 7/2015 | Bye et al. | |
| 2015/0266575 A1 | 9/2015 | Borko | |
| 2015/0339930 A1 | 11/2015 | McCann et al. | |
| 2016/0009390 A1 | 1/2016 | Kugelmass et al. | |
| 2016/0009402 A1 * | 1/2016 | Hunter | B64C 39/02 244/53 R |
| 2016/0039541 A1 * | 2/2016 | Beardsley | G05D 1/0088 701/2 |
| 2016/0075452 A1 | 3/2016 | Robles et al. | |
| 2016/0257426 A1 | 9/2016 | Mozer | |
| 2016/0307448 A1 | 10/2016 | Salnikov et al. | |
| 2016/0368590 A1 | 12/2016 | Karem et al. | |
| 2017/0069214 A1 | 3/2017 | Dupray et al. | |
| 2017/0120443 A1 | 5/2017 | Kang et al. | |
| 2017/0144776 A1 | 5/2017 | Fisher et al. | |
| 2017/0248125 A1 | 8/2017 | Luchsinger et al. | |
| 2017/0248969 A1 | 8/2017 | Ham et al. | |
| 2017/0269594 A1 | 9/2017 | Sydnor | |
| 2017/0278409 A1 | 9/2017 | Johnson et al. | |
| 2017/0334559 A1 | 11/2017 | Bouffard et al. | |
| 2017/0351254 A1 | 12/2017 | Listwin et al. | |
| 2018/0009764 A1 | 1/2018 | Mitchell et al. | |
| 2018/0061251 A1 | 3/2018 | Venkatraman et al. | |
| 2018/0086459 A1 | 3/2018 | Rios | |
| 2018/0099764 A1 | 4/2018 | Schill et al. | |
| 2018/0102057 A1 | 4/2018 | Lo et al. | |

(56) References Cited

U.S. PATENT DOCUMENTS

| | | | |
|---|---|---|---|
| 2018/0126851 A1 | 5/2018 | Koebler et al. | |
| 2018/0273170 A1* | 9/2018 | D'Sa | B64C 39/024 |
| 2018/0305191 A1 | 10/2018 | Renquist | |
| 2019/0300185 A1 | 10/2019 | Tang et al. | |
| 2019/0377021 A1 | 12/2019 | Bhalwankar et al. | |
| 2020/0094991 A1 | 3/2020 | Datas et al. | |
| 2020/0101571 A1 | 4/2020 | Datas et al. | |
| 2020/0172267 A1 | 6/2020 | Darbonville et al. | |
| 2021/0061027 A1 | 3/2021 | Da et al. | |
| 2021/0319705 A1 | 10/2021 | Furumoto | |
| 2021/0080285 A1 | 11/2021 | Connor | |
| 2021/0258067 A1 | 11/2021 | Hoshino et al. | |
| 2022/0348356 A1 | 11/2022 | Millspaugh | |

FOREIGN PATENT DOCUMENTS

| | | |
|---|---|---|
| CN | 108216682 A | 6/2018 |
| DE | 3501769 A1 | 7/1986 |
| DE | 102017102481 A1 | 8/2018 |
| EP | 2949516 A1 | 12/2015 |
| WO | 2017083406 A1 | 5/2017 |
| WO | 2017130137 A1 | 8/2017 |
| WO | 2017197245 A1 | 11/2017 |
| WO | 2018234799 A1 | 12/2018 |

OTHER PUBLICATIONS

Martin, R.A. et al., Dynamic Optimization of High-Altitude Solar Aircraft Trajectories UnderStation-Keeping Constraints. Journal of Guidance, Control, and Dynamics, Nov. 21, 2018, vol. 42, No. 3, pp. 538-552Figures 11 and 13; Section III B Trajectory Results 2. Single Orbit Analysis and 3. Trajectory Stages.
Fayyaz Muhammad et al.:"Survey and future directions of fault-tolerant distributed computing on board spacecraft", Advances in Space Research, Elsevier, Amsterdam, NL, vol. 58, No. 11, Aug. 22, 2016 (Aug. 22, 2016), pp. 2352-2375, XP029801074, ISSN: 0273-1177, DOI: 10.1016/J.ASR.2016.08.017*p. 2354, section 2.2p. 2355, Fig. 1 and left column, 2nd paragraphp. 2360-2361:section 4.2.1.*.
Abraham et al, "Dynamic Optimization of High-Altitude Solar Aircraft Trajectories Under Station-Keeping Constraints", Journal of Guidance and Control and Dynamics, vol. 42, No. 3, Nov. 26, 2018, pp. 538-552.
Hosseini Saghar et al.: "Optimal path planning and power allocation for a long endurance solar-powered UAV", 2015 American Control Conference (ACC), IEEE, Jun. 17, 2013 (Jun. 17, 2013), pp. 2588-2593, XP032476633, ISSN: 0743-1619, DOI: 10.1109/ACC. 2013.6580224 [retrieved on Aug. 14, 2013] *p. 2589-p. 2592*.
Lee Joo-Seok et al.: Flight path optimization of solar powered UAV for endurance flight, 2015 54th Annual Conference of the Society of Instrument and Control Engineers of Japan( (SICE), The Society of Instrument and Control Engineers—SICE, Jul. 28, 2015 (Jul. 28, 2015), pp. 820-823, XP033220597, DOI:10.1109/SICE.2015. 7285496 [retrieved on Sep. 30, 2015] *whole document*.

\* cited by examiner

FIG. 2

FIG. 3A DAYTIME

FIG. 3B SUNSET

FIG. 3C NIGHT

FIG. 3D SUNRISE

METHODS OF CLIMB AND GLIDE OPERATIONS OF A HIGH ALTITUDE LONG ENDURANCE AIRCRAFT

CROSS-REFERENCE TO RELATED APPLICATION

This application is a 35 U.S.C § 371 National Stage Entry of International Application No. PCT/US2020/029652, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/854,830, filed May 30, 2019, the contents of all of which are hereby incorporated by reference herein for all purposes.

FIELD OF ENDEAVOR

The invention relates to generally to Unmanned Aerial Vehicles (UAVs), and more particularly to powering UAVs.

BACKGROUND

Unmanned aerial vehicles (UAVs), such as a High Altitude Long Endurance aircraft, are lightweight planes that are capable of controlled, sustained flight. Generally speaking, UAVs rely on at least one battery to power the aircraft. The battery is typically charged throughout the day via a solar array onboard the aircraft. The energy of the charged battery may then be applied to a motor (or motors) to sustain propulsion of the UAV during the night when solar capture is no longer possible

SUMMARY

A system embodiment may include: at least one unmanned aerial vehicle (UAV); at least one battery pack comprising at least one battery; and at least one motor of the at least one UAV, where the at least one battery may be configured to transfer energy to the at least one motor; where power from the at least one motor may be configured to ascend the at least one UAV to a second altitude when the at least one battery may be at or near capacity, and where the second altitude may be higher than the first altitude; and where power from the at least one motor may be configured to descend the at least one UAV to the first altitude after the Sun has set to conserve energy stored in the at least one battery.

Additional system embodiments may include: at least one solar array covering at least a portion of a surface of a wing of each UAV. In additional system embodiments, the at least one battery pack may further include at least one power tracker. In additional system embodiments, the power tracker may be configured to receive energy from the solar array, and the at least one battery may be configured to receive energy from the power tracker to charge the at least one battery. In additional system embodiments, an energy required to ascend from the first altitude to the second altitude may be greater than an energy required to descend from the second altitude to the first altitude.

In additional system embodiments, power from the at least one motor may be configured to loiter the at least one UAV at the first altitude after the descent of the at least one UAV until the Sun rises to conserve energy stored in the at least one battery. In additional system embodiments, loitering comprises at least one of: stopping the at least one motor of the UAV and slowing the at least one motor of the UAV.

In additional system embodiments, the second altitude may be between 10,000 feet and 15,000 feet higher than the first altitude, and the first altitude may be between 60,000 feet and 70,000 feet. In additional system embodiments, the second altitude may be based on wind speeds at altitudes above the first altitude. In additional system embodiments, a rate of ascent of the at least one UAV may be greater than a rate of descent of the at least one UAV.

A method embodiment may include: transferring energy stored in at least one battery to at least one motor of at least one unmanned aerial vehicle (UAV), where the at least one battery may be at or near capacity, where the at least one battery receives power from a solar array of the UAV, and where the at least one UAV may be at a first altitude; ascending, by using the transferred energy of the at least one battery of the at least one UAV, to a second altitude, where the second altitude may be higher than the first altitude; and descending, by the at least one UAV, from the second altitude to the first altitude after the Sun has set to conserve energy stored in the at least one battery.

Additional method embodiment may further include: loitering, by the at least one UAV, at the second altitude until the Sun rises to conserve energy stored in the at least one battery. In additional method embodiments, loitering at the second altitude comprises: stopping the at least one motor of the at least one UAV. In additional method embodiments, loitering at the second altitude comprises: slowing the at least one motor of the at least one UAV.

In additional method embodiments, the solar array covers at least a portion of a surface of a wing of the at least one UAV. In additional method embodiments, a battery pack comprises the at least one battery and at least one power tracker, where the power tracker receives energy from the solar array, and where the at least one battery receives energy from the power tracker to charge the at least one battery. In additional method embodiments, an energy required to ascend from the first altitude to the second altitude may be greater than an energy required to descend from the second altitude to the first altitude.

In additional method embodiments, the second altitude may be between 10,000 feet and 15,000 feet higher than the first altitude, and where the first altitude may be between 60,000 feet and 70,000 feet. In additional method embodiments, the second altitude may be based on wind speeds at altitudes above the first altitude. In additional method embodiments, a rate of ascent of the at least one UAV may be greater than a rate of descent of the at least one UAV.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Near the end of the day, a battery on an unmanned aerial vehicle (UAV) will become nearly fully charged since the UAV has been exposed to solar radiation throughout the duration of the day when the sun is above the horizon. At this point, excess energy may become available. Batteries disposed on the UAV may harness this excess energy and continue powering the UAV to sustain flight. However, the additional batteries are costly. Furthermore, UAV aircraft are light and batteries can account for a substantial fraction of the total weight of the UAV. Therefore, including additional batteries may result in undesired weight onboard the UAV which may hinder the performance of the UAV.

A system embodiment may include using excess energy from a solar array that can no longer be stored in a fully charged battery associated with a solar-powered UAV. The system and method disclosed herein may assist in propulsion of the aircraft when solar energy is no longer available to the aircraft, such as at night. In one embodiment, the UAV is a High Altitude Long Endurance solar-powered aircraft. The excess energy may be used by the UAV to climb to a higher altitude. The aircraft may then glide down to lower altitude, and the gliding down process may delay the time needed to access the battery stores accumulated by the end of day, thereby conserving energy.

In one embodiment, the battery of the UAV is a Lithium ion (Li-ion) battery. When the Li-ion battery becomes close to being fully charged the battery may no longer be able to charge rapidly, requiring a slow taper off of the charge. Fully charged batteries discharge when they are left unused, and may lose effectiveness (e.g., the ability to charge rapidly). Additionally, over-charging of the battery may cause the battery to overheat and even burn. Once the battery is fully charged, the charging current has to be dissipated. The result is the generation of heat and gasses, both of which are harmful for the battery. Therefore, it is desired to stop the charging process before any damage may be done to the battery, while at all times maintaining the battery temperature within pre-determined limits of the battery. There is a battery voltage associated with the battery. A bus connected to the battery may be kept above the battery voltage and the bus may charge the battery at a rate appropriate for the battery. It is not desired to have the bus voltage be much higher than the battery in order to avoid too much power going to the battery.

As the battery charges, both the battery and the bus voltage may float upwards. As the battery gets close to full charge, the charging may be tapered as to not over-charge the battery. At this point, there may be excess energy produced as the solar array may still be capturing solar radiation. Rather than wasting the solar power as to avoid over-charging of the battery, the excess solar energy may be harnessed to engage the motor and cause the aircraft to climb to a higher altitude.

From the higher altitude achieved by the ascent of the aircraft, the UAV may then glide down to a previous, or lower, altitude. The gliding down process delays how long the system needs to access the battery stores. The climb and glide method disclosed herein allows the UAV to sustain flight by accessing free excess solar energy to climb to a higher altitude, while also avoiding the extra weight that would come from including additional batteries onboard.

Figure 1:
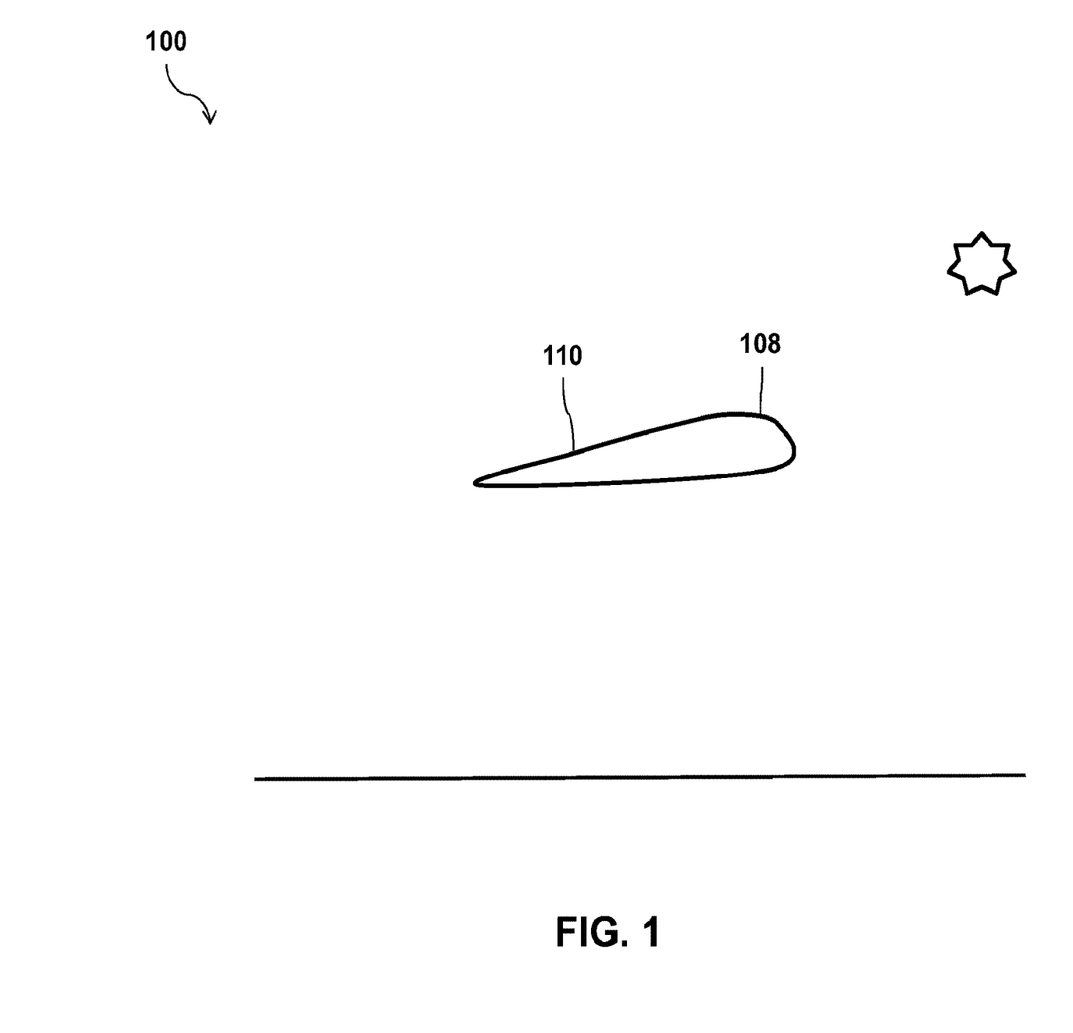
FIG. 1 depicts a system for climb and glide operations of an unmanned aerial vehicle, according to one embodiment.

With respect to FIG. 1, a system (100) for an unmanned aerial vehicle (UAV) 108 climb and glide operations is depicted. UAVs are aircraft with no onboard pilot and may fly autonomously or remotely. In one embodiment, the UAV 108 is a high altitude long endurance aircraft. The UAV 108 may have between one and forty motors, and a wingspan between one-hundred feet and 400 feet. In one embodiment, the UAV 108 has a wingspan of approximately 260 feet and is propelled by 10 electric motors powered by the solar array 110 covering at least a portion of the surface of the wing, resulting in zero emissions. Flying at an altitude of approximately 65,000 feet above sea level and above the clouds, the UAV 108 is designed for continuous, extended missions of up to months without landing.

The UAV 108 functions optimally at high altitude due at least in part to the lightweight payload of the UAV, and is capable of considerable periods of sustained flight without recourse to land. In one embodiment, the UAV 108 may weigh approximately 3,000 lbs and may include wing panel sections and a center panel, providing for efficient assembly and disassembly of the aircraft 108 due to the attachability and detachability of the wing panel sections to each other and/or to the center panel.

Figure 2:
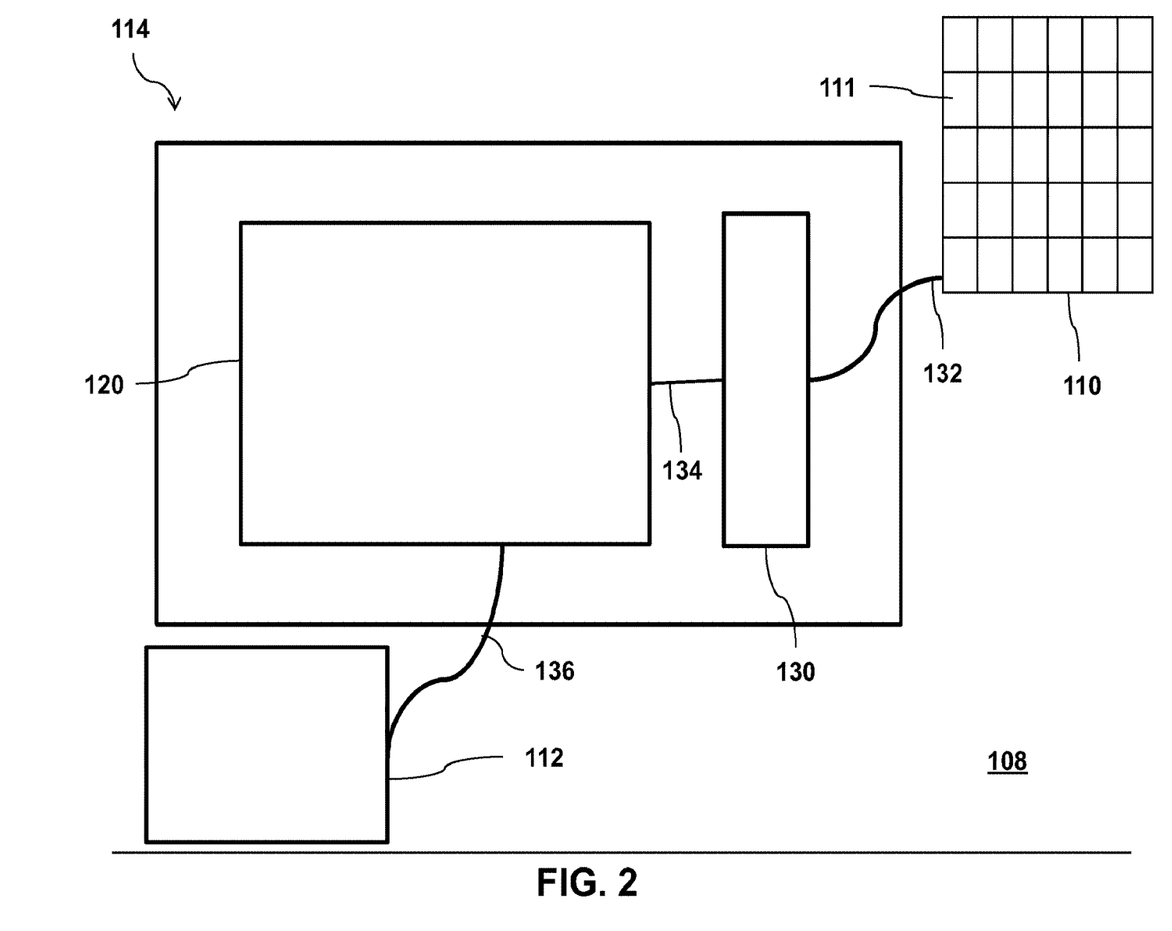
FIG. 2 depicts a system for powering the unmanned aerial vehicle of FIG. 1, according to one embodiment.

With respect to FIG. 2, the UAV 108 further includes at least one motor 112 coupled to the UAV 108 for propulsion of the UAV 108. In one embodiment, the UAV 108 has ten electric motors 112. The UAV 108 may further include a solar array 110 configured to capture solar energy from the sun when the sun is above the horizon. The solar energy, in turn, is used to power all or part of the UAV's propulsion. The solar array 110 may be disposed on the top wing surface of the UAV 108. As the UAV points toward or away from the sun, the solar array 110 faces the sun to efficiently capture the solar radiation. This is because the more area of the solar array that is exposed to the sun, the more solar radiation will be captured by the solar array. In one embodiment, as the sun sets, the solar array 110 no longer captures solar radiation. However, the energy captured by the solar array 110 throughout the day when the sun was above the horizon may be converted to electrical energy to charge or provide power to a battery. More specifically, the solar array 110 may contain a plurality of solar array cells 111. The cells 111 may be photovoltaic (PV) cells. In one embodiment, the cells 111 convert the captured solar energy into direct current (DC) electrical energy. In one embodiment, the solar array 110 may produce approximately 150 volts.

This conversion of solar energy to electricity may be achieved using semiconducting materials in the PV cells which exhibit the photovoltaic effect, where light (i.e., photons) are converted to electricity (i.e., voltage). In one example, the semiconducting material of the cells 111 is gallium arsenide (GaAs). In another example, the semiconducting material is silicon. Other semiconducting materials are possible and contemplated.

A battery pack 114 includes a battery 120 for powering the UAV. In one embodiment, the battery 120 is a lithium ion (Li-ion) battery. It is desired to maximize the life span of the battery 120, such as the "cycle life" and the "calendar life". Cycle life refers to the aging of the battery 120 based on the overall operating (or usage) time of the battery 120. More specifically, the cycle life is the number of full discharge-charge cycles of the battery 120. The calendar life is the aging of the battery 120 which is just as a function of time. The cycle life may be decreased by a number of factors, including; (1) strain caused by operating a too high or low of a voltage state, (2) high charge rates, (3) charging at very cool temperatures, and (4) high discharge rates. The calendar life of the Li-ion battery 120 may lose capacity with time, and the loss in capacity may be exacerbated by generally operating at very high and low temperatures, and spending too much time at high states of charge during storage. Detection of a cut-off point and terminating the charge so not too much time is spent at high states of charge is critical in preserving battery life. There may be a predetermined upper voltage limit, or "termination voltage", beyond which the charge may be terminated. This is particularly important with fast chargers where the danger of overcharging is greater. In one embodiment, the battery 120 may have a long life cycle, enabling the support of extended missions and can be operated in extreme environmental conditions, such as low temperatures.

The battery pack 114 may further include at least one power tracker 130 proximate the battery 120. In another embodiment, the power tracker 130 may be located outside of the battery pack 114. The power tracker 130 is in communication with the solar array 110, and the power tracker 130 is configured to receive electrical energy produced by the solar array 110. More specifically, the cells 111 of the solar array convert sunlight into electrical energy and the power tracker 130 receives the electricity from the solar array 110 from an output 132, such as a bus, of the solar array 110. The solar array 110 operates at a lower voltage than the bus. In one embodiment, the power tracker is a maximum power point tracker (MPPT) controller configured to boost voltage from the solar array 110 to the output 132 and to adjust a boost ratio to get the maximum power from the solar array.

The power tracker 130 has an output 134 configured for supplying electrical charge to the battery 120. In one embodiment, the power tracker 130 is configured to maximize the power from the solar array 110, and to regulate the voltage transmitted to the battery. For example, the amount of solar radiation captured, and hence, produced by the solar array 110 may vary throughout the day as the sun's position changes in the sky. The power tracker 130 may be used to provide a steady voltage to the battery 120. In one embodiment, the battery 120 may sustain approximately 270-380 volts, as opposed to roughly 150 volts coming solely from the solar array. In one embodiment, the desired operating temperature of the battery 120 is in the range of 10° C. to 50° C.

When the battery 120 becomes close to being fully charged the battery may no longer be able to charge rapidly, requiring a slow taper off of the charge. If the battery 120 is fully charged, the battery 120 may discharge when the battery 120 is left unused and may lose effectiveness, e.g., the ability to charge rapidly. Additionally, over-charging of the battery 120 may cause the generation of heat and gasses, both of which are harmful for the battery 120, or cause the battery 120 to overheat and even burn.

Once the battery 120 is fully charged, the charging current may need to be reduced as it is desired to taper off the charging process before any damage to the battery 120 occurs, while at all times maintaining the battery 120 temperature within its pre-determined limits. In one embodiment, the battery 120 temperature is maintained within its pre-determined limits by adjusting the power tracker 130 voltage boost ratio to operate the solar array 110 conditions that may reduce the energy output of the solar array 110. In another embodiment, the battery 120 temperature is maintained within its pre-determined limits by absorbing the extra current with the aircraft propulsion system. In another embodiment, the battery 120 temperature is maintained within its pre-determined limits by adjusting the power tracker 130 voltage boost ratio in combination with the aircraft propulsion system.

At this point there may be excess energy available as the solar array 110 may still be capturing solar radiation that may be transferred to the battery 120. Therefore, rather than wasting the energy as to avoid over-charging of the battery 120, the excess solar energy may be harnessed to engage the one or more motors 112 to cause the UAV 108 to climb in altitude. The charged battery 120 is configured to drive the one or more motors 112 of the UAV 108, and the battery pack system 114 ensures that battery 120 will have enough stored energy to power the motor 112 for continuous flight.

In one embodiment, the battery 120 has an output 136 configured to transmit electrical energy to the motor 112. In one example, the electrical energy is a DC current. The motor 112 receives the electrical energy from the battery 120 for propulsion of the UAV 108.

Figure 3A:
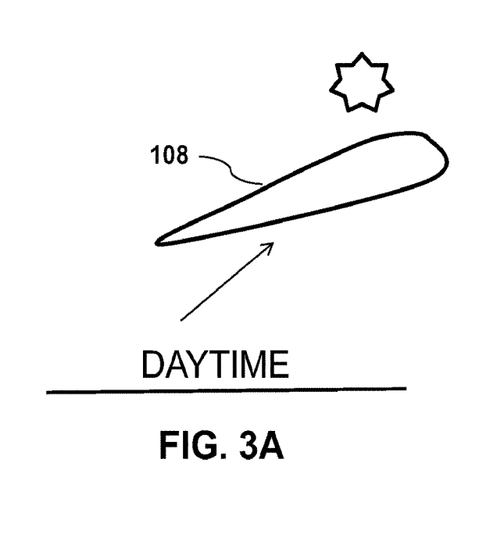
FIG. 3A depicts the unmanned aerial vehicle of FIG. 1 climbing to higher altitude during the daytime, according to one embodiment.
Figure 3B:
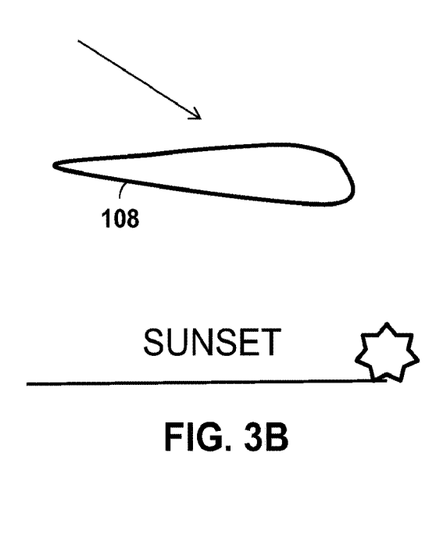
FIG. 3B depicts the unmanned aerial vehicle of FIG. 1 gliding down to lower altitude as the sun sets below the horizon, according to one embodiment.
Figure 3C:
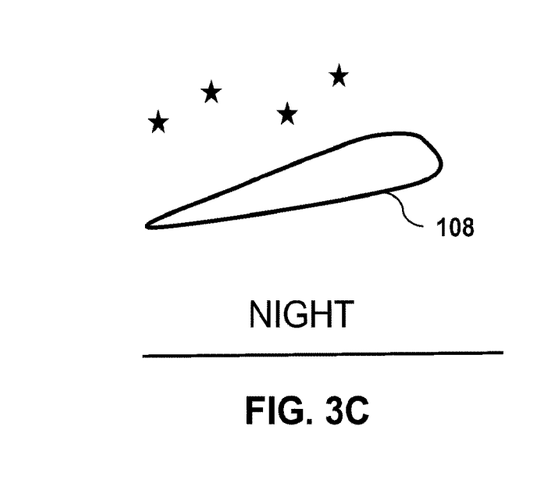
FIG. 3C depicts the unmanned aerial vehicle of FIG. 1 loitering at lower altitude during the night, according to one embodiment.
Figure 3D:
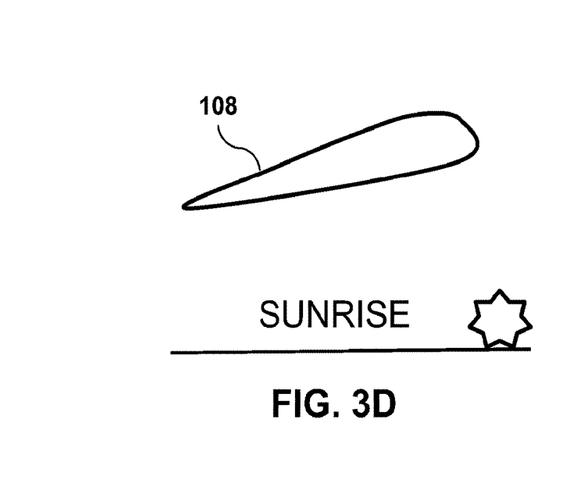
FIG. 3D depicts the unmanned aerial vehicle of FIG. 1 loitering at lower altitude as the sun rises above the horizon, according to one embodiment.

With respect to FIGS. 3A-D, a climb and glide method is illustrated for sustaining flight of the UAV 108 by accessing free excess energy to climb to a higher altitude, while also avoiding the extra weight that would come from including additional batteries onboard. Excess energy dissipated from the solar array 110 not needed to charge the battery 120 as the battery 120 is nearly fully charged later in the day may be transferred to the UAV motor 112, as shown in FIG. 2. The extra power provided to the motor 112, as shown in FIG. 2, may cause the UAV 108 to ascend to higher altitude, as shown in FIG. 3A. In one embodiment, the angle of ascent is approximately 10°. In one embodiment, the UAV 108 power tracker 130 may taper off the current transmitted to the battery 120 later in the day as the battery 120 may be nearly full. With respect to FIG. 3B, the UAV 108 may then conserve energy by gliding down to lower altitude when there is no longer sufficient solar power to maintain the climb or level flight, such as when the sun is setting below the horizon. In one embodiment, the angle of descent is approximately 6°. The gliding down process delays the time the UAV 108 needs to access the battery stores. In one embodiment, the UAV 108 may climb an additional 10,000-15,000 feet from a starting altitude and glide back down 10,000 feet to the same starting altitude. In one embodiment, the UAV 108 begins climbing from a starting altitude of 60,000 feet and reaches 70,000 feet, then glides back down from 70,000 feet to 60,000 feet. In another embodiment, the UAV 108 begins climbing from a starting altitude of 65,000 feet and reaches 75,000 feet, then glides back down from 75,000 feet to 65,000 feet. In one embodiment, the UAV 108 begins climbing from a starting altitude of 65,000 feet and reaches 80,000 feet, then glides back down from 80,000 feet to 65,000 feet. Other starting altitudes between 60,000 feet and 70,000 feet are possible. The UAV 108 may then further conserve energy at night by stopping or slowing the motor 112 and loitering at lower altitude, as shown in FIG. 3C. With respect to FIG. 3D, as the sun rises above the horizon the UAV 108 may continue to loiter at lower altitude until the sun is sufficiently high above the horizon for the UAV 108 to begin capturing solar energy with the solar array 110.

In another embodiment, the climb and glide method may be applied in inclement weather, such as strong wind events. For example, if strong winds are predicted and it is advantageous to be another 2,000 feet higher, the climb and glide method may be used to ascend to higher altitude and above the winds. Less energy from the battery may be needed in lower winds as compared to in higher winds. The ascent of each UAV from a first or starting altitude to a second or maximum altitude may be based on wind speeds at elevations above the first or starting altitude, weather conditions, weather forecasts, or the like.

In yet another embodiment, a fleet of UAVs 108 may climb and glide in unison in any one of the embodiment methods described above. In another embodiment, the UAVs 108 of the fleet may ascend at slightly different times.

The climb and glide method disclosed here allows the UAVs 108 to sustain flight by accessing free excess energy provided by the solar array 110 to climb to a higher altitude, while also avoiding the extra weight that would come from including additional batteries onboard.

Figure 3E:
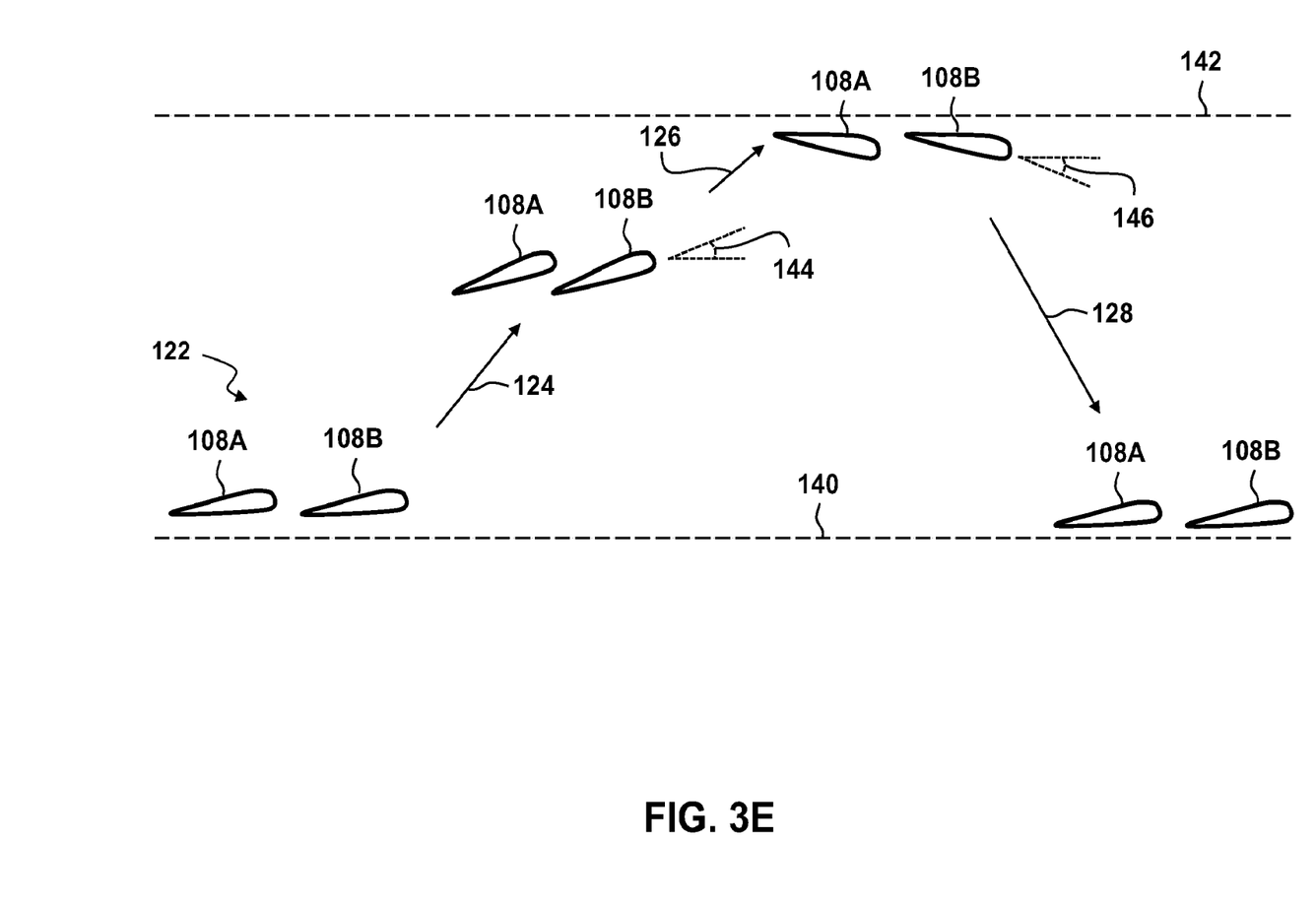
FIG. 3E depicts a fleet of unmanned aerial vehicles of FIG. 1 loitering, climbing, gliding, and loitering throughout the day, according to one embodiment.

FIG. 3E depicts a fleet 122 of UAVs 108A,B of FIG. 1 loitering, climbing, gliding, and loitering throughout the day, according to one embodiment. A fleet of UAVs may include three or more UAVs 108A,B. Two UAVs 108A,B are depicted for the purpose of illustration but any number of UAVs greater than one may be shown. The method and system disclosed herein may be applied to a fleet 122 of UAVs 108A,B. In some embodiments, the fleet 122 may include hundreds, or even thousands, of UAVs.

The UAVs 108A,B may loiter at a first altitude 140, such as 65,000 feet during the day. Each UAV 108A,B may include a solar array 110, as shown in FIG. 2, for charging one or more batteries. Once the batteries are at, or near, capacity each UAV 108A,B may ascend 124 to a second or higher altitude 142, such as 75,000 feet. Each UAV 108A,B may ascend 124 at the same time in some embodiments. In other embodiments, each UAV 108A,B may ascend 124 at different times, e.g., when each respective UAV has a battery at full capacity or a set capacity. The rate of ascent 144 may be about 10° relative to horizon in some embodiments. In some embodiments, each UAV 108A,B may ascend 124 when sunlight is still available to provide power to the batteries that is depleted during the ascent 124.

Once each UAV 108A,B reaches the higher altitude 142, each UAV may either loiter at the higher altitude 142 or begin to descend 128. Each UAV 108A,B may descend 128 at the same time in some embodiments. In other embodiments, each UAV 108A,B may descend 128 at different times, e.g., when each respective UAV stops receiving charge from their respective solar arrays 110, as shown in FIG. 2. The rate of descent 146 may be about 6°, or about −6° relative to horizon, in some embodiments. The rate of ascent 124 may be steeper than a corresponding rate of descent 128. Each UAV 108A, 108B may expend more energy to ascend 124 when sunlight is still available and conserve more energy while descending 128 as sunlight may not be available. In some embodiments, each UAV 108A,B may descend 128 when sunlight is no longer available. Each UAV 108A,B may be desired to reach the first altitude 140 at or about sunrise when their respective solar arrays 110, as shown in FIG. 2, may begin charging the batteries. If each UAV 108A,B reaches the first altitude 140 prior to sunrise, each UAV 108A,B may continue to loiter, e.g., maintain level or substantially level flight, until their respective solar arrays 110, as shown in FIG. 2, may begin charging the batteries. In some embodiments, the higher altitude 142 may be adjusted based on the capabilities of each UAV 108A,B; a charge of each battery of each UAV 108A,B; a season relating to the amount of sunlight and darkness in each day; and the like. The energy needed to loiter at the lower altitude 140 after the ascent may be the same as the energy needed to remain at the lower altitude 140 without an ascent. However, by ascending to the second altitude 142, each UAV 108A,B is able to use less energy when descending 128 than loitering at the lower altitude 140. Accordingly, each UAV 108A,B uses energy at the end of the day when the UAV batteries are fully charged to ascend 124 and then conserve energy throughout the night, e.g., after sunset and before sunrise when the batteries are not charging, by descending 128 to the lower altitude 140 and/or loitering if needed.

Figure 4:
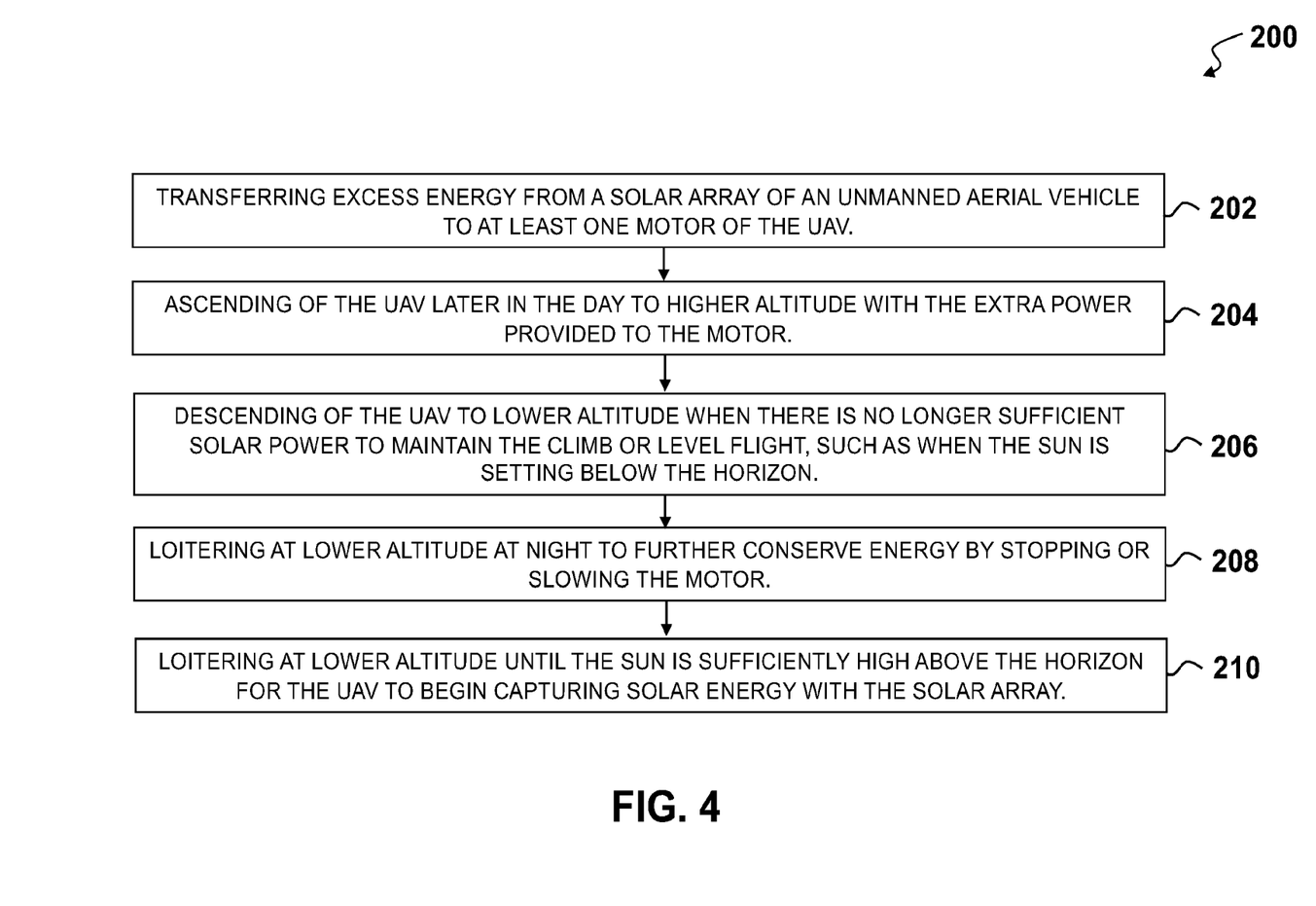
FIG. 4 shows a flowchart of a method climb and glide operations of an unmanned aerial vehicle, according to one embodiment.

With respect to FIG. 4, a flowchart of a method 200 for climb and glide operations of an unmanned aerial vehicle (UAV) is illustrated. In one embodiment, the method provides for accessing free excess energy to climb to a higher altitude, while also avoiding the extra weight that would come from including additional batteries onboard. Excess energy from a solar array of the UAV may be transferred to at least one motor of the UAV (step 202). This excess energy dissipated from the solar array of the UAV not be needed to charge a battery of the UAV as the battery is nearly fully charged later in the day may be transferred to the at least one motor of the UAV. The extra power provided to the motor may cause the UAV to ascend to higher altitude (step 204). In one embodiment, the angle of ascent is approximately 10°. In one embodiment, a power tracker of the UAV may taper off the current transmitted to the battery later in the day as the battery may be nearly full. The UAV may then conserve energy by gliding down to lower altitude when there is no longer sufficient solar power to maintain the climb or level flight, such as when the sun is setting below the horizon (step 206). In one embodiment, the angle of descent is approximately 6°. The gliding down process delays the time the UAV needs to access the battery stores. In one embodiment, the UAV 108 may climb an additional 10,000-15,000 feet from a starting altitude and glide back down 10,000 feet to the same starting altitude. In one embodiment, the UAV begins climbing from a starting altitude of 60,000 feet and reaches 70,000 feet, then glides back down from 70,000 feet to 60,000 feet. In another embodiment, the UAV begins climbing from a starting altitude of 65,000 feet and reaches 75,000 feet, then glides back down from 75,000 feet to 65,000 feet. In one embodiment, the UAV begins climbing from a starting altitude of 65,000 feet and reaches 80,000 feet, then glides back down from 80,000 feet to 65,000 feet Other starting altitudes between 60,000 feet and 70,000 feet are possible.

The UAV may then further conserve energy at night by stopping or slowing the motor and loitering at lower altitude (step 208). As the sun rises above the horizon the UAV may continue to loiter at lower altitude until the sun is sufficiently high above the horizon for the UAV to begin capturing solar energy with the solar array (step 210).

In another embodiment, the climb and glide method may be applied in inclement weather, such as strong wind events. For example, if strong winds are predicted and it is advantageous to be another 2000 feet higher, the climb and glide method may be used to ascend to higher altitude and above the winds. In yet another embodiment, a fleet of UAVs may climb and glide in unison in any one of the embodiment methods described above. In another embodiment, the UAVs of the fleet may ascend at slightly different times.

The climb and glide method 200 allows the UAV to sustain flight by accessing free excess energy provided by the solar array to climb to a higher altitude, while also avoiding the extra weight that would come from including additional batteries onboard.

Figure 5:
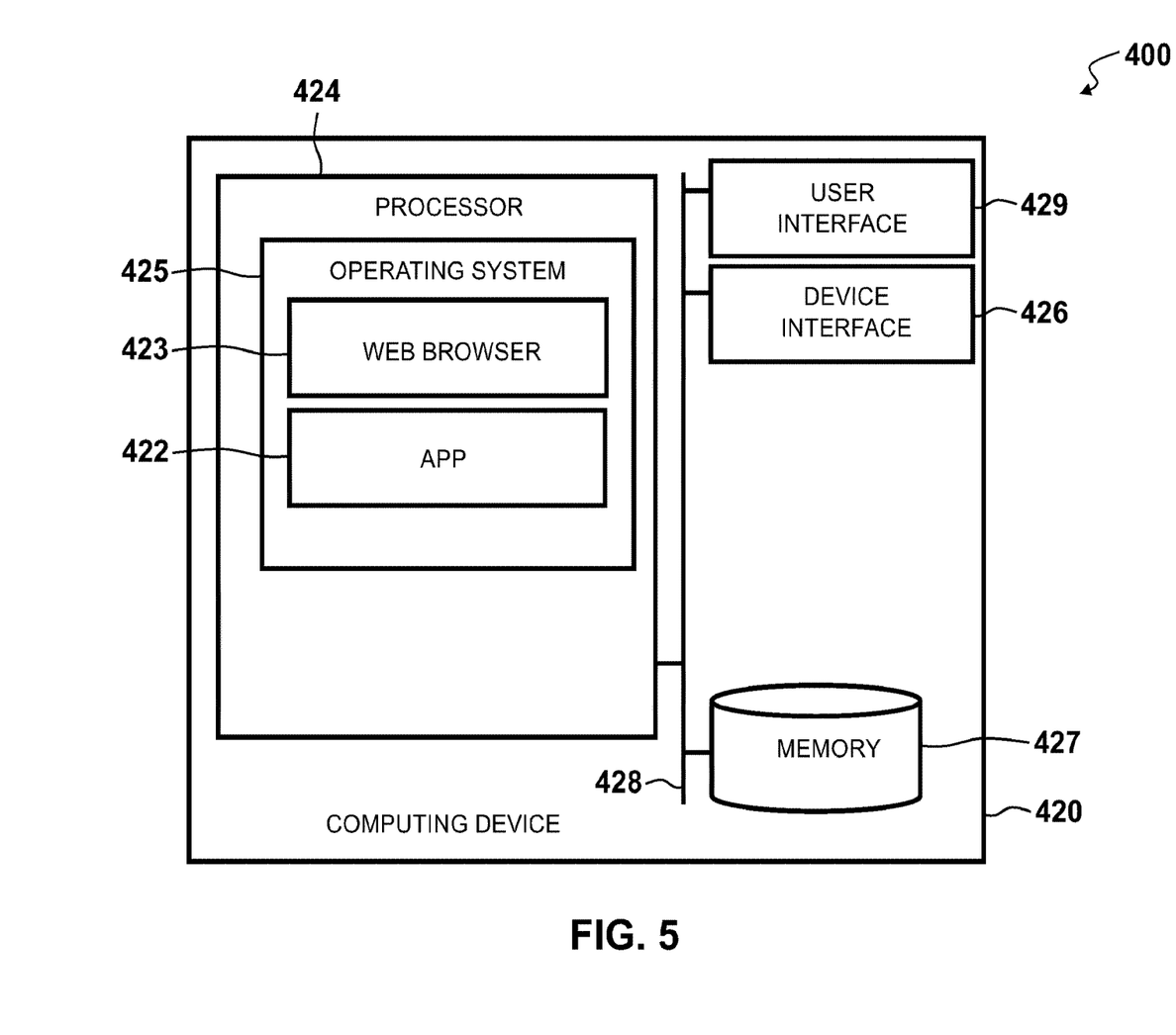
FIG. 5 illustrates an example top-level functional block diagram of a computing device embodiment.

FIG. 5 illustrates an example of a top-level functional block diagram of a computing device embodiment 400. The example operating environment is shown as a computing device 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above. In one embodiment, the processor 424 may control the ascent, descent, and loiter of the UAV. In one embodiment, the processor 424 may measure and/or track a battery status, charge level, or the like. In one embodiment, the processor 424 may track and/or receive information on the Sun position, weather conditions, weather forecast, cloud cover, and the like. In some embodiments, the processor 424 may ascend, descend, or loiter based on one or more commands received from a ground control station and/or an external source. In other embodiments, the processor 424 may autonomous or semi-autonomously ascend, descend, and/or loiter the UAV.

Figure 6:
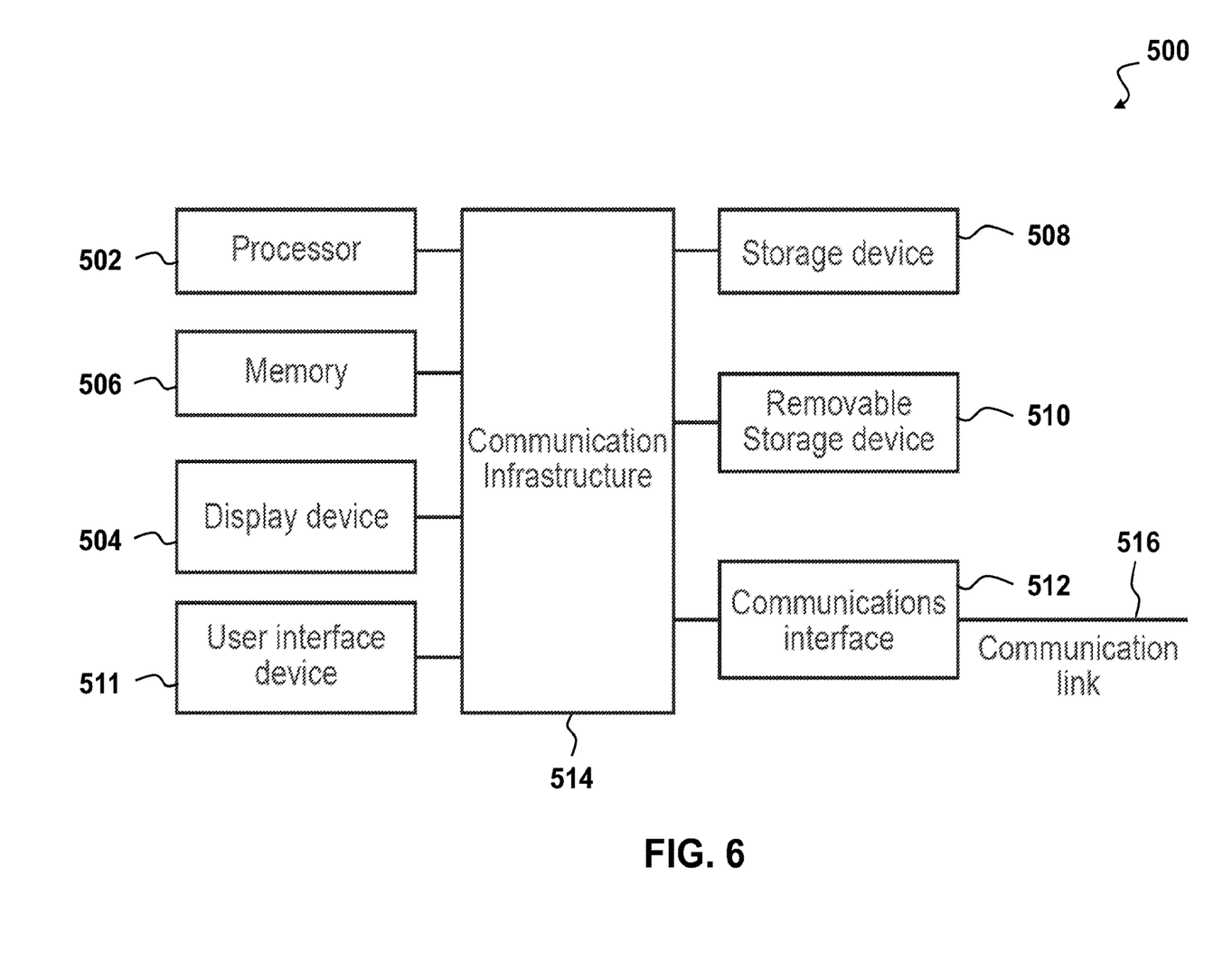
FIG. 6 shows a high-level block diagram and process of a computing system for implementing an embodiment of the system and process.

FIG. 6 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RANI)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 7:
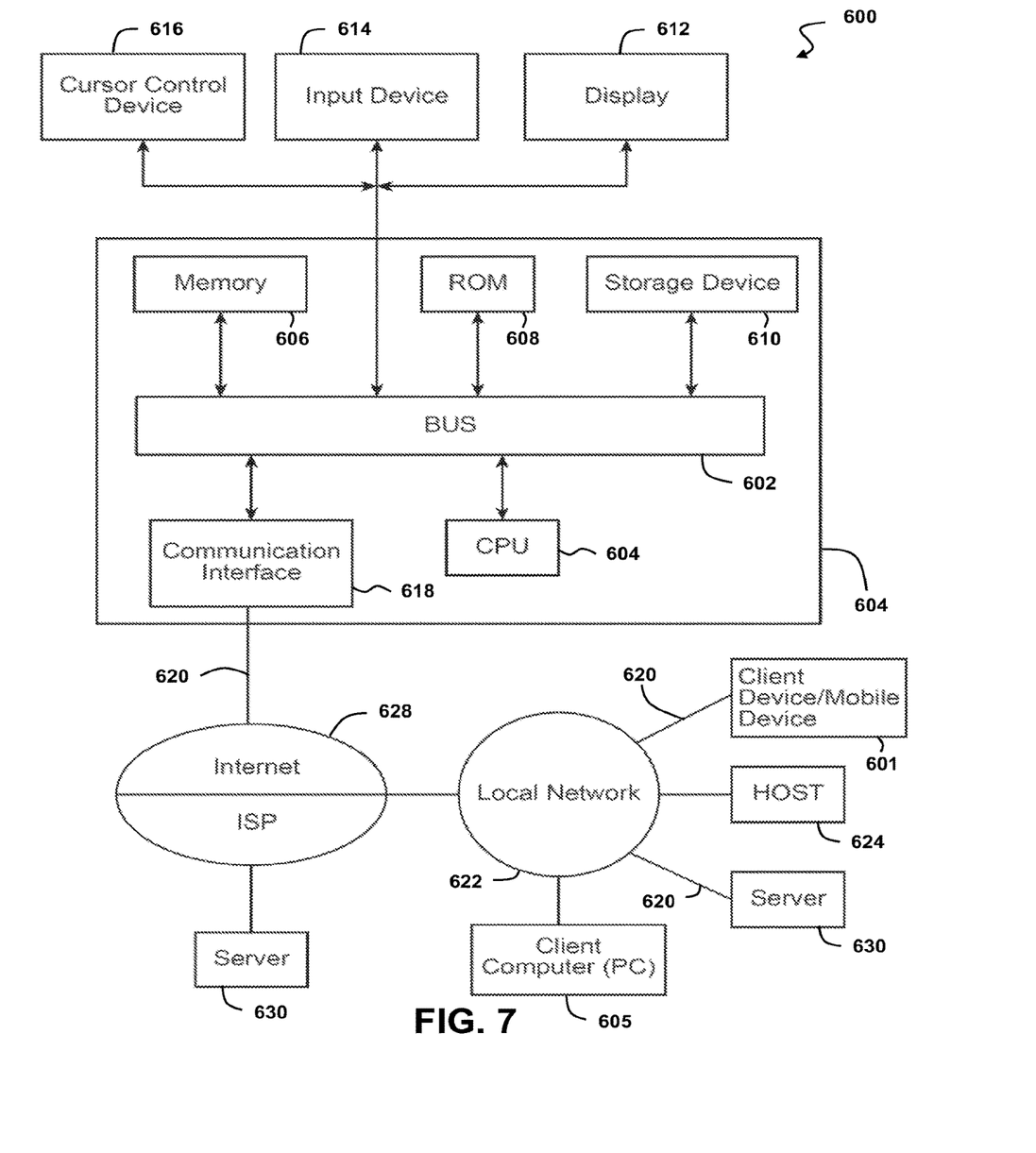
FIG. 7 shows a block diagram and process of an exemplary system in which an embodiment may be implemented.

FIG. 7 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 8:
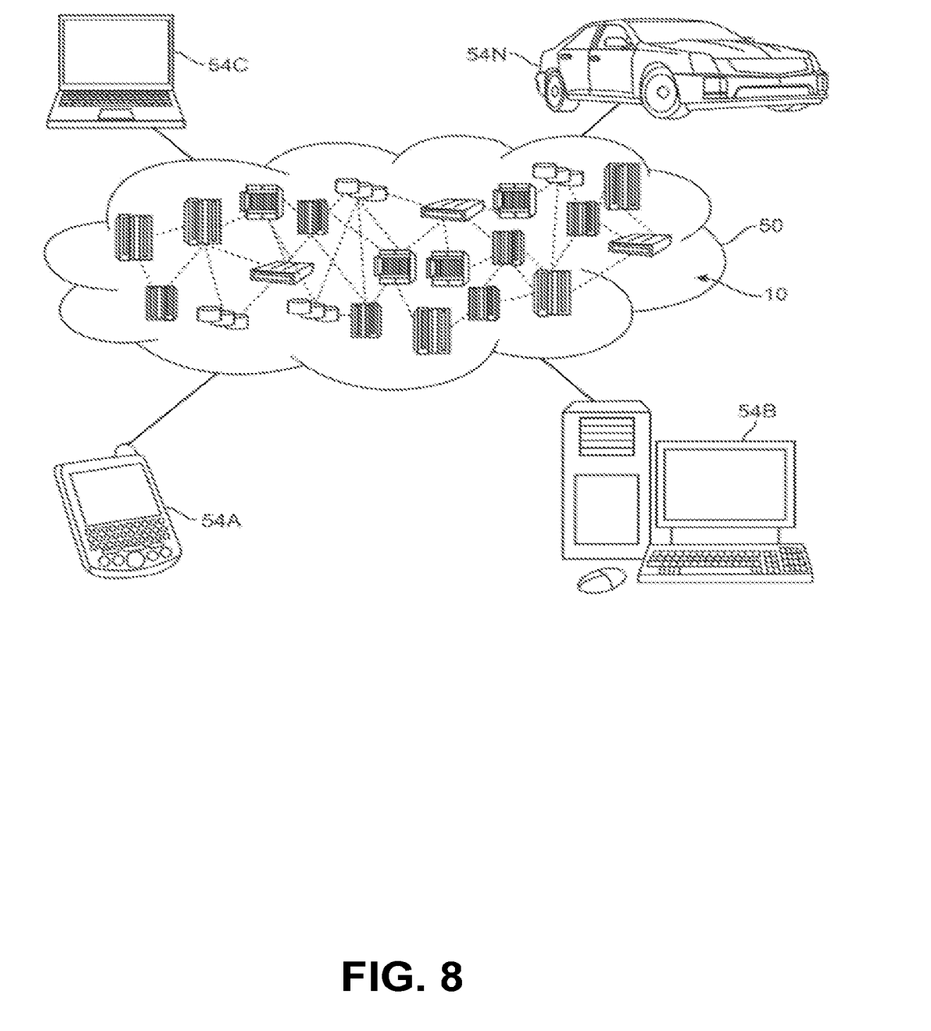
FIG. 8 depicts a cloud computing environment for implementing an embodiment of the system and process disclosed herein.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
   at least one unmanned aerial vehicle (UAV);
   at least one solar array;
   at least one battery pack comprising at least one battery and at least one power tracker, wherein the power tracker is configured to:
      receive energy from the at least one solar array; and
      regulate and supply the received energy to the at least one battery based on a time of day; and
   at least one motor of the at least one UAV, wherein the at least one battery is configured to transfer energy to the at least one motor;
   wherein power from the at least one motor is configured to ascend the at least one UAV to a second altitude when the at least one battery is at or near capacity, and wherein the second altitude is higher than the first altitude; and
   wherein power from the at least one motor is configured to descend the at least one UAV to the first altitude after the Sun has set to conserve energy stored in the at least one battery.

2. The system of claim 1, further comprising:
   at least one solar array covering at least a portion of a surface of a wing of each UAV.

3. The system of claim 1, wherein an energy required to ascend from the first altitude to the second altitude is greater than an energy required to descend from the second altitude to the first altitude.

4. The system of claim 1, wherein power from the at least one motor is configured to loiter the at least one UAV at the first altitude after the descent of the at least one UAV until the Sun rises to conserve energy stored in the at least one battery.

5. The system of claim 4, wherein loitering comprises at least one of: stopping the at least one motor of the UAV and slowing the at least one motor of the UAV.

6. The system of claim 1, wherein the second altitude is between 10,000 feet and 15,000 feet higher than the first altitude, and wherein the first altitude is between 60,000 feet and 70,000 feet.

7. The system of claim 6, wherein the second altitude is based on wind speeds at altitudes above the first altitude.

8. The system of claim 1, wherein a rate of ascent of the at least one UAV is greater than a rate of descent of the at least one UAV.

9. A method, comprising:
   transferring energy stored in at least one battery to at least one motor of at least one unmanned aerial vehicle (UAV), wherein the at least one battery is at or near capacity, wherein the at least one battery receives power from a solar array of the UAV, and wherein the at least one UAV is at a first altitude;
   ascending, by using the transferred energy of the at least one battery of the at least one UAV, to a second altitude, wherein the second altitude is higher than the first altitude; and descending, by the at least one UAV, from the second altitude to the first altitude after the Sun has set to conserve energy stored in the at least one battery.

10. The method of claim 9, further comprising:
loitering, by the at least one UAV, at the first second altitude until the Sun rises to conserve energy stored in the at least one battery.

11. The method of claim 10, wherein loitering at the first altitude comprises:
stopping the at least one motor of the at least one UAV.

12. The method of claim 10, wherein loitering at the first altitude comprises:
slowing the at least one motor of the at least one UAV.

13. The method of claim 9, wherein the solar array covers at least a portion of a surface of a wing of the at least one UAV.

14. The method of claim 9, wherein a battery pack comprises the at least one battery and at least one power tracker, wherein the power tracker receives energy from the solar array, and wherein the at least one battery receives energy from the power tracker to charge the at least one battery.

15. The method of claim 1, wherein an energy required to ascend from the first altitude to the second altitude is greater than an energy required to descend from the second altitude to the first altitude.

16. The method of claim 1, wherein the second altitude is between 10,000 feet and 15,000 feet higher than the first altitude, and wherein the first altitude is between 60,000 feet and 70,000 feet.

17. The method of claim 16, wherein the second altitude is based on wind speeds at altitudes above the first altitude.

18. The method of claim 9, wherein a rate of ascent of the at least one UAV is greater than a rate of descent of the at least one UAV.

* * * * *